(12) United States Patent
Abu-Odeh et al.

(10) Patent No.: US 7,389,860 B2
(45) Date of Patent: Jun. 24, 2008

(54) ENERGY ABSORBING DEVICE HAVING NOTCHES AND PRE-BENT SECTIONS

(75) Inventors: Akram Y. Abu-Odeh, College Station, TX (US); Roger P. Bligh, Bryan, TX (US); Dean C. Alberson, Bryan, TX (US); Jacob R. Ness, Sugar Land, TX (US)

(73) Assignee: The Texas A&M University System, College Station, TX (US)

( * ) Notice: Subject to any disclaimer, the term of this patent is extended or adjusted under 35 U.S.C. 154(b) by 208 days.

(21) Appl. No.: 11/092,802

(22) Filed: Mar. 28, 2005

(65) Prior Publication Data

US 2005/0211520 A1 Sep. 29, 2005

Related U.S. Application Data

(60) Provisional application No. 60/557,728, filed on Mar. 29, 2004.

(51) Int. Cl.
*F16F 7/12* (2006.01)
*E01F 15/00* (2006.01)

(52) U.S. Cl. ............... 188/377; 188/376; 256/13.1

(58) Field of Classification Search ............ 188/371, 188/376, 377; 256/13.1; 404/6; 293/132, 293/133; 138/119; 74/492; 280/784; 52/731.2, 52/731.6
See application file for complete search history.

(56) References Cited

U.S. PATENT DOCUMENTS

| | | | | |
|---|---|---|---|---|
| 3,412,628 A | * | 11/1968 | De Gain | 188/377 |
| 3,815,437 A | * | 6/1974 | Martin | 74/492 |
| 4,410,208 A | | 10/1983 | Mulso, Jr. et al. | 293/132 |
| 4,413,840 A | * | 11/1983 | Shah | 280/784 |
| 4,645,375 A | | 2/1987 | Carney, III | |
| 4,674,911 A | | 6/1987 | Gertz | |
| 4,684,151 A | | 8/1987 | Drewek | 280/784 |
| 4,815,565 A | | 3/1989 | Sicking et al. | |

(Continued)

FOREIGN PATENT DOCUMENTS

DE 1137607 * 10/1962

(Continued)

OTHER PUBLICATIONS

PCT Search Report & Written Opinion for PCT/US2005/010717, 15 pages, Oct. 7, 2005.

*Primary Examiner*—Thomas J Williams
(74) *Attorney, Agent, or Firm*—Baker Botts L.L.P.

(57) ABSTRACT

According to one embodiment of the invention, an energy-absorbing device includes a section of material having a plurality of crush zones along a longitudinal length thereof, a first crush zone of the plurality of crush zones including a pair of opposed first bends formed in a first side and a second side of the section, a pair of opposed second bends formed in a third side and a fourth side of the section, and a first set of notches spaced around a perimeter of the section at a longitudinal location corresponding to the first bends and second bends. The first bends project in a direction that is one of inward and outward and the second bends project in a direction opposite that of the first bends. At least one of the other crush zones includes a second set of notches spaced around the perimeter of the section.

26 Claims, 5 Drawing Sheets

U.S. PATENT DOCUMENTS

| | | | |
|---|---|---|---|
| 5,192,157 A | 3/1993 | Laturner | |
| 5,431,445 A | 7/1995 | Wheatley | 280/784 |
| 5,851,005 A | 12/1998 | Muller et al. | |
| 6,293,727 B1 | 9/2001 | Albritton | |
| 6,932,201 B2 * | 8/2005 | Akiyama et al. | 188/377 |
| 2002/0101086 A1 | 8/2002 | Koch et al. | 293/133 |

FOREIGN PATENT DOCUMENTS

| | | |
|---|---|---|
| DE | 26 36 696 | 8/1976 |
| DE | 4209826 A1 * | 9/1993 |
| DE | 10256000 A1 * | 6/2004 |
| EP | 1477371 A2 * | 11/2004 |
| FR | 2730025 A1 * | 8/1996 |

* cited by examiner

ENERGY ABSORBING DEVICE HAVING NOTCHES AND PRE-BENT SECTIONS

RELATED APPLICATIONS

This application claims the benefit of application Ser. No. 60/557,728 titled "Box Cushion with Cut-outs and Pre-bent Sections," filed provisionally on Mar. 29, 2004.

TECHNICAL FIELD OF THE INVENTION

The present invention relates generally to the field of energy-absorbing impact devices and, more particularly, to an energy absorbing device having notches and pre-bent sections.

BACKGROUND OF THE INVENTION

Energy-absorbing impact devices absorb and/or attenuate energy during an impact event for different applications, such as an errant vehicle impacting a road hazard (roadside safety), a vehicle impacting another vehicle (vehicle crashworthiness), an occupant impacting a collapsible steering column (occupant safety), and a helicopter impacting the ground at uncontrolled velocity (collapsible landing gear for occupant safety), to name a few.

A crash cushion is an energy absorbing device that is placed in front of a fixed hazard to "cushion" the hazard. Its function is to reduce the impact severity of an errant vehicle impacting the hazard by absorbing the kinetic energy of the moving vehicle in a controlled manner when impacted head-on. A crash cushion should also be able to redirect an errant vehicle impacting on the cushion's sides since it is possible for such impacts to occur.

There are several crash cushion devices available. For example, some are barrel-based crash cushion systems, such as the Reusable Energy Absorbing Crash Terminal ("REACT") 350 or Connecticut Impact Attenuator System ("CIAS"). Both of these systems utilize the transverse collapsing of cylinders (steel or polyethylene) to dissipate energy of an impacting object. However, these designs use circular cylinders that are oriented about a vertical rather than longitudinal axis. Thus, the cylinders are loaded and collapse in a lateral rather than end-on manner. Most of the remaining crash cushion systems utilize an energy absorbing component like a polymer cartridge (QuadGuard), a metal tearing (TRACC), or a pneumatic (air chambers) crash cushion that need another component for side impact protection, which is usually steel rails or steel plates arranged in an overlapping configuration (fish-scale pattern).

SUMMARY OF THE INVENTION

According to one embodiment of the invention, an energy-absorbing device includes a section of material having a plurality of crush zones along a longitudinal length thereof, a first crush zone of the plurality of crush zones including a pair of opposed first bends formed in a first side and a second side of the section, a pair of opposed second bends formed in a third side and a fourth side of the section, and a first set of notches spaced around a perimeter of the section at a longitudinal location corresponding to the first bends and second bends. The first bends project in a direction that is one of inward and outward and the second bends project in a direction opposite that of the first bends. At least one of the other crush zones includes a second set of notches spaced around the perimeter of the section.

Embodiments of the invention provide a number of technical advantages. Embodiments of the invention may include all, some, or none of these advantages.

An energy absorbing device according to an embodiment of the present invention is simple in design and is minimal in its use of specially-designed terminal heads or devices. In one embodiment, a box cushion absorbs and/or attenuates energy during an impact event for different applications, such as errant vehicle on road hazard, vehicle crashworthiness, collapsible steering column, and collapsible helicopter landing gear. It can be placed where a non-reusable crash cushion is warranted, such as rural roads and low accident rate locations. An energy absorbing component of the device may serve as a redirecting function as well, thus reducing complexity associated with two components for two functions systems. The system may be made of a sheet or sheets of any of various materials to form a generally closed section (rectangular, circular or any other form). The section may be optimized to attain a desired buckling or collapsing force for a given energy absorbing application.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION

Figure 1A:
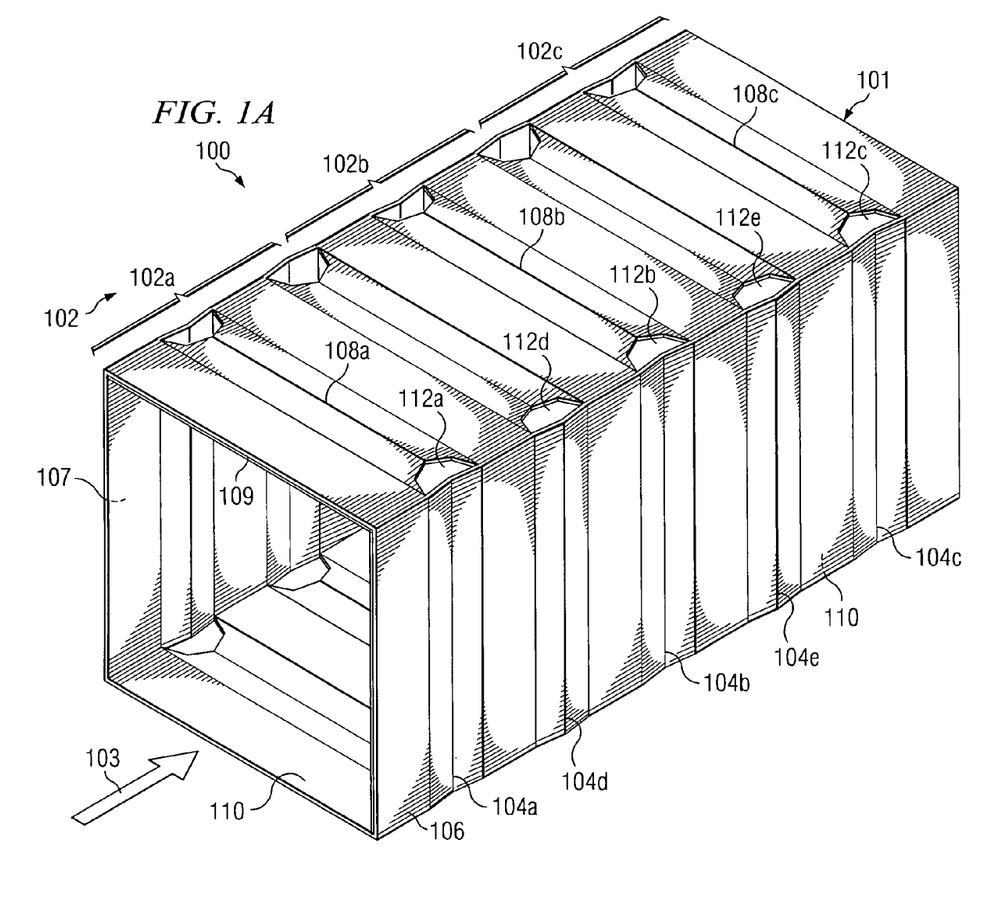
FIGS. 1A, 1B and 1C are perspective, plan, and elevation views, respectively, of an energy absorbing device in accordance with one embodiment of the present invention.
Figure 1B:
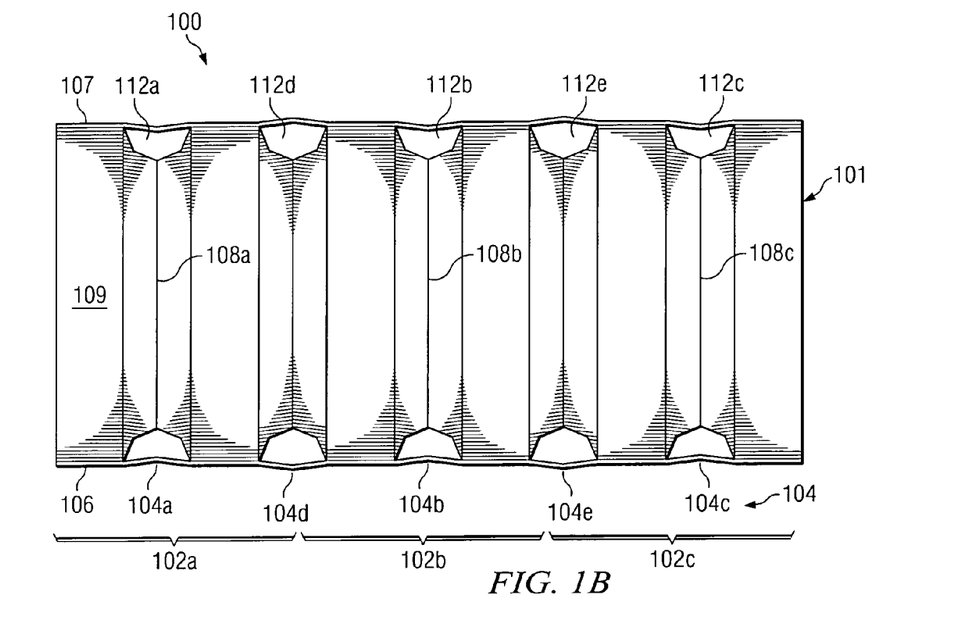
Figure 1C:
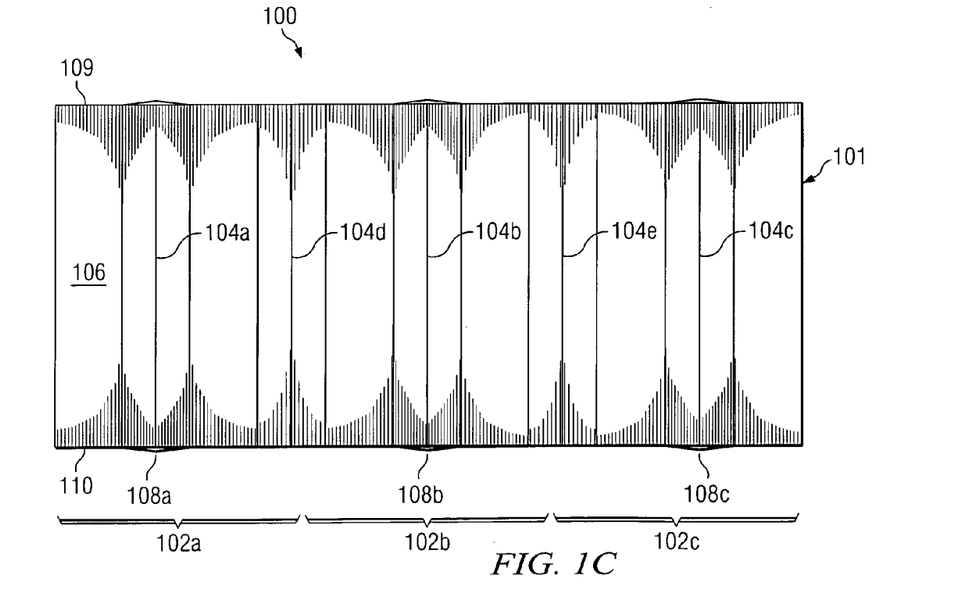

FIGS. 1A, 1B and 1C are perspective, plan, and elevation views, respectively, of an energy-absorbing device 100 in accordance with one embodiment of the present invention. Generally, energy-absorbing device 100 absorbs and/or attenuates energy during an impact event for different applications, such as crash cushions, truck-mounted attenuators, bumper isolators for automobiles, landing gears, and energy-absorbing couplers. However, the present invention contemplates energy-absorbing device 100 being utilized in any suitable application.

In the illustrated embodiment, energy-absorbing device 100 includes a section 101 of material having a plurality of crush zones 102 along a longitudinal length thereof. The longitudinal direction for energy-absorbing device 100 is indicated by arrow 103. Each crush zone 102 includes a pair of first bends 104 formed in a first side 106 and a second side 107 of section 101, a pair of second bends 108 formed in a third side 109 and a fourth side 110 of section 101, and a plurality of notches 112 spaced about the periphery of section 101 at a longitudinal location corresponding to first bends 104 and second bends 108 in addition to the intersection of crush zones 102.

In the illustrated embodiment, section 101 has a varying cross-section along its length. In addition, although section 101 is represented in FIGS. 1A-1C as having a generally rectangular cross-section along its length, the present invention contemplates section 101 having any suitable cross-section along its length, such as having a circular, triangular, hexagonal, or other cross-section. Since FIG. 1 illustrates section 101 as being a generally rectangular section, third side 109 may be referred to herein as the "top" of section 101 and fourth side 110 may be referred to herein as the "bottom" of section 101. In addition, first bends 104 may be referred to herein as "vertical" bends and second bends 108 may be referred to herein as "horizontal" bends.

Energy-absorbing device 100 may have any suitable dimensions and may be formed from any suitable material. For example, in one embodiment, the dimensions of section 101 may be generally two feet wide by two feet high by three and a half feet long, the material may be a suitable structural steel, such as ASTM A36 or ASTM A992, and the thickness may be between approximately twelve gage and approximately eight gage. Again, the dimensions, thickness and type of material for energy-absorbing device 100 is variable depending on the type of application for which energy-absorbing device 100 is contemplated. Furthermore, section 101 may be formed from a single sheet of material or may be formed from multiple sheets of material in any suitable manner. For example, components of energy-absorbing device 100 may be formed separately from one another and then welded or otherwise joined together to form energy-absorbing device 100.

Figure 1D:
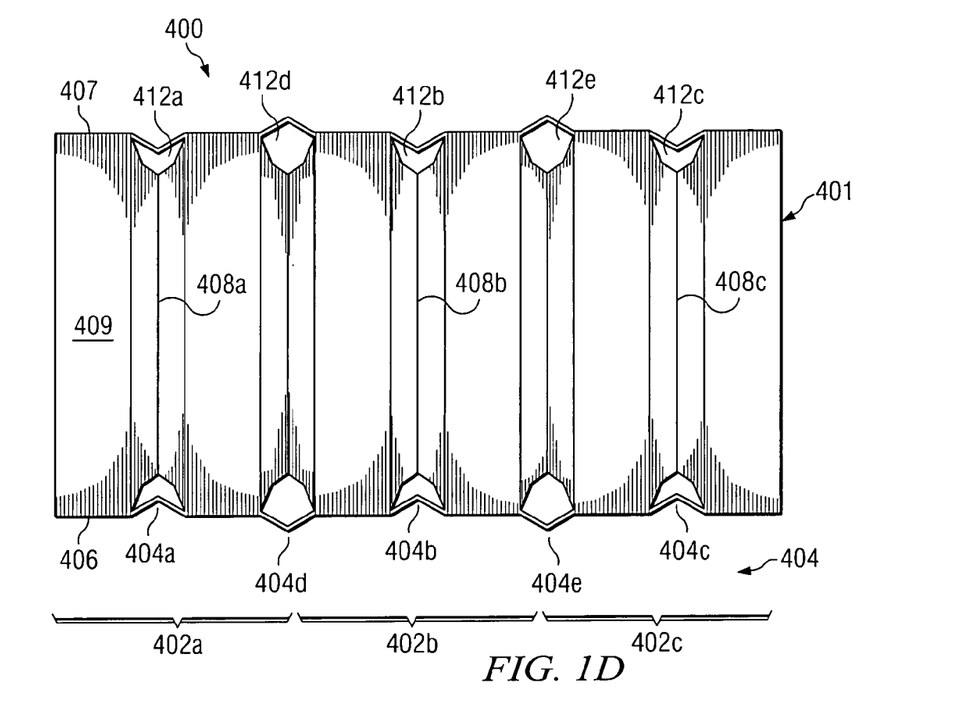
FIG. 1D is a partial plan view of an energy absorbing device in accordance with another embodiment of the present invention.

Any suitable number of crush zones 102 are contemplated by the present invention. As examples, FIGS. 1A-1C illustrate section 101 as having three crush zones 102, while FIG. 1D illustrates a section 401 as having five crush zones 402. FIG. 1D is described in more detail below. Crush zones 102 may be defined by bends 104, notches 112, or a combination of bends 104 and notches 112. Crush zones 102 may also have any suitable length.

Vertical bends 104 cause sides 106 and 107 to be non-planar by projecting either inward toward the center of section 101 or outward from the center of section 101. The apex of bends 104 may project inwardly or outwardly any suitable distance from a vertical plane. As best illustrated in FIG. 1B, vertical bends 104 are angled bends; however, bends 104 may have any suitable contour, such as being curved. Another example of vertical bends is shown and illustrated in FIG. 1D, which is a partial plan view of an energy absorbing device 400 in accordance with another embodiment of the present invention. In this embodiment, each vertical bend 404 is associated with a respective crush zone 402 and is generally centered within its crush zone 402. Although vertical bends 404 may have any suitable contour, in the illustrated embodiment, vertical bends 404 are angled bends and are disposed between two flat sections of a side 407. Notice the alternating projections of vertical bends 404. Hence, vertical bend 404a projects inwardly, vertical bend 404b projects outwardly, and so on. However, the present invention contemplates any suitable projection direction for vertical bends 404.

Referring back to FIGS. 1A-1C, various arrangements for vertical bends 104 are contemplated by the present invention. For example, in one embodiment of the invention, as described in more detail below in conjunction with FIG. 2, vertical bends 104 do not exist. In another embodiment, only first crush zone 102a includes vertical bends 104a while the other crush zones (102b, 102c) may not have vertical bends. Other arrangements for vertical bends 104 are contemplated by the present invention.

As best illustrated in FIG. 1C, horizontal bends 108 cause top 109 and bottom 110 to be non-planar by projecting either inward toward the center of section 101 or outward from the center of section 101. Horizontal bends 108 may have any suitable contour and may deviate from a horizontal plane any suitable distance. As examples, horizontal bends 108 may have a contour as shown best in FIG. 1C or may have a contour similar to vertical bends 404 shown in FIG. 1D. In addition, the present invention contemplates horizontal bends 108 having any suitable arrangement. For example, in one embodiment as described in more detail below in conjunction with FIG. 2, horizontal bends 108 do not exist. In other embodiments, horizontal bends 108 may exist in any suitable crush zone 102. For example, in a particular embodiment of the invention, only horizontal bends 108a exist in crush zone 102a. The remaining crush zones (102b, 102c) may not have horizontal bends.

In one embodiment, in order to facilitate the controlled collapsing of energy-absorbing device 100 in an efficient manner, horizontal bends 108 project in a direction opposite that of their respective vertical bends 104. For example, referring to FIG. 1A, if vertical bends 104a project inwardly, then horizontal bends 108a project outwardly, and vice versa. In addition, in one embodiment, horizontal bends 108 and vertical bends 104 are in longitudinal alignment. However, the present invention contemplates horizontal bends 108 and vertical bends 104 being slightly longitudinally misaligned while still meeting the objectives of the present invention.

Notches 112 may have any suitable size and any suitable shape. For example, although notches 112 are illustrated in FIG. 1B as being trapezoidal, notches 112 may also be rectangular, circular, or other suitable shapes. As described above, notches 112 are spaced about the periphery of section 101. In the illustrated embodiment, notches 112 are formed proximate the four corners of section 101. Notches 112 may be formed only in top 109 and bottom 110 of section 101, as illustrated, or may be formed both in top 109 and sides 106, 107 and/or bottom 110 and sides 106, 107, as shown and described below in conjunction with FIG. 2. One potential advantage of having notches 112 formed only in top 109 and bottom 110 is to prevent any snagging of errant vehicles that impact either side 106 or side 107.

The present invention contemplates any suitable spacing for notches 112. In the embodiment illustrated in FIGS. 1A through 1C, notches 112a, 112b, 112c correspond to the vertical bends 104a, 104b, 104c and horizontal bends 108a, 108b, 108c of section 101, and notches 112d and 112e correspond to the intersections of crush zones 102. Other suitable arrangements and location of notches 112 are contemplated by the present invention. In one embodiment, the shape and dimensions of notches 112 as well as the type of material and thickness for section 101 can be modified to achieve different desired absorbing rates for energy-absorbing device 100 depending upon the application. This also may include the number and location of vertical bends 104 and horizontal bends 108. For example, energy-absorbing device 100 may be utilized in a crash cushion application and designed so that it meets certain requirements of NCHRP Report 350, which is herein incorporated by reference.

In operation of one embodiment of the invention, utilizing energy-absorbing device 100 of FIGS. 1A-1C, an impact force (from an automobile, for example) strikes the front end of section 101 in the direction indicated by arrow 103. Section 101 then starts to longitudinally collapse in order to dissipate the energy in a controlled manner so as to protect any occupants in the automobile. First, crush zone 102a collapses (i.e., is compressed or flattened) because vertical bends 104a move inward toward the inside of section 101 while horizontal bends 108a move away from the inside of section 101. Second, crush zone 102b collapses because vertical bends 104b move inward toward the inside of section 101 while horizontal bends 108b move away from the inside of section 101. Lastly, crush zone 102c collapses because vertical bends 104c move inward toward the inside of section 101 while horizontal bends 108c move away from the inside of section 101. Thus, energy-absorbing device 100 collapses in such a manner as to efficiently dissipate the energy from the impact force at its front end.

Figure 2:
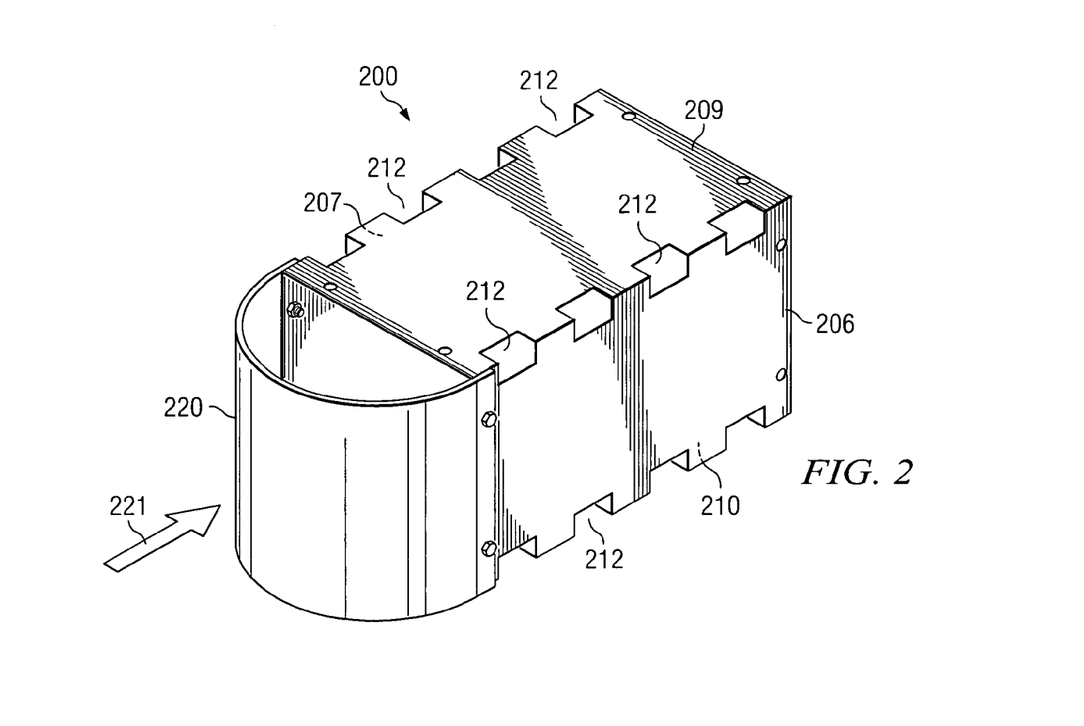
FIG. 2 is a perspective view of an energy absorbing device in accordance with another embodiment of the present invention.

FIG. 2 is a perspective view of an energy-absorbing device 200 in accordance with another embodiment of the present invention. In this embodiment, energy-absorbing device 200 illustrates rectangular notches intermittently spaced along a longitudinal length of a generally rectangular section. In one embodiment, notches 212 are located proximate the four corners of the rectangular section and are formed in both sides 206, 207 and top 209 and bottom 210. Energy-absorbing device 200, as shown, does not include either vertical bends 104 or horizontal bends 108. However, as described above, the present invention contemplates energy-absorbing device 200 having any suitable vertical bends and/or horizontal bends in addition to any suitable number of crush zones.

Also illustrated in FIG. 2 is an impact head or end cap 220 coupled to a front end of the rectangular section in any suitable manner. Impact head 220 is illustrated in FIG. 2 as having a semi-circular shape; however, other suitable shapes and configurations are contemplated by the present invention. Impact head 220 functions to help direct energy from an impact into the sides 206 and 207 of energy-absorbing device 200. For example, the impact may come from an automobile in a general direction as noted by arrow 221. Any suitable structural member or members are contemplated for impact head 220.

An operation of one embodiment of energy-absorbing device 200 of FIG. 2 is similar to that of energy-absorbing device 100 of FIGS. 1A-1C except that notches 212 determine the buckling locations for the section because energy-absorbing device 200 contains no bends. Thus, for example, after a force strikes impact head 220, a portion of top 209 and bottom 210 corresponding to the first set of notches move either outward or inward and a portion of sides 206, 207 corresponding to the first set of notches move in a direction opposite that of top 209 and bottom 210. Then, another portion of top 209 and bottom 210 corresponding to the next set of notches move either outward or inward and another portion of sides 206, 207 corresponding to the next set of notches move in a direction opposite that of this portion of top 209 and bottom 210. The direction of movement for subsequent portions of top 209, bottom 210, and sides 206, 207 is opposite that of previous directions. In other words, if the initial movement for top 209 and bottom 210 is outward, then the next direction is inward.

Figure 3A:
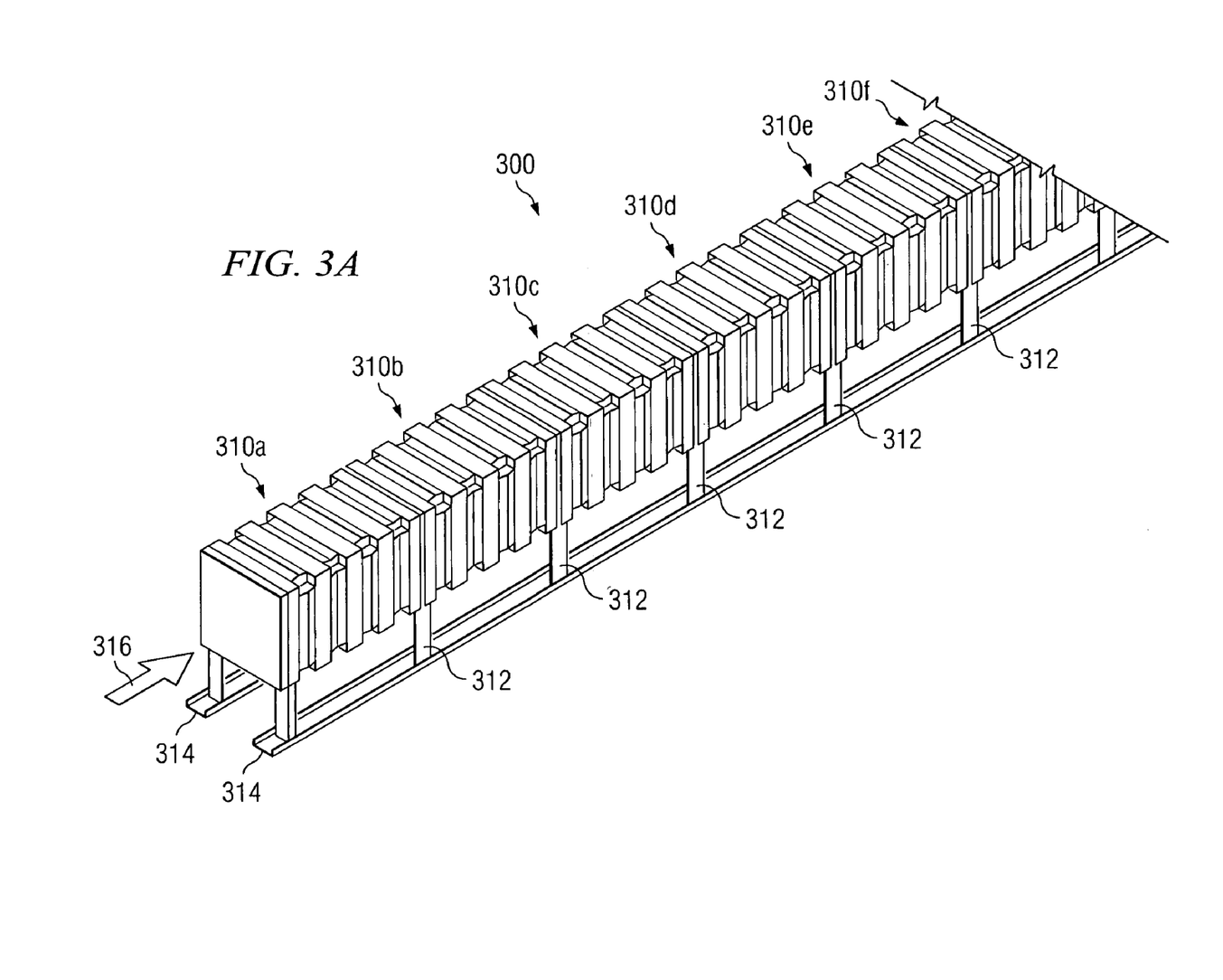
FIG. 3A is an example of a crash cushion according to one embodiment of the invention.

FIG. 3A is an example of a crash cushion 300 according to one embodiment of the invention. In the illustrated embodiment, crash cushion 300 includes a plurality of energy-absorbing devices 310 arranged in an end-to-end manner. Energy-absorbing devices 310 may also couple to one another in any suitable manner, such as bolting, welding, or other suitable joining processes. In one embodiment, energy-absorbing devices 310 are coupled to one another via suitable structural frames coupled to the end or ends of energy-absorbing devices 310. These structural frames may be formed from any suitable material, such as angle irons formed of structural steel. Energy-absorbing devices 310 may take the form of energy-absorbing device 100, energy-absorbing device 200, or other suitable configurations within the teachings of the invention.

Energy-absorbing devices 310 may be supported by a plurality of support posts 312 that couple to or engage the ground. Support posts 312 may have any suitable configuration, may be formed from any suitable material, and may be spaced apart any suitable distance. For example, in one embodiment of the invention, support posts 312 are formed from structural steel and are spaced apart approximately three to four feet. Support posts 312 may couple to energy-absorbing devices 310 in any suitable manner. For example, support posts 312 may couple directly to energy-absorbing devices 310 or any structural frames that are associated therewith, or may be formed integral with the structural frames. In one embodiment, support posts 312 engage a pair of rail members 314 that may or may not be ground-mounted rail members. Rail members 314 may have any suitable configuration to allow for slidable movement of support posts 312 along rail members 314 as energy-absorbing devices 310 collapse from an end-on impact.

Figure 3B:
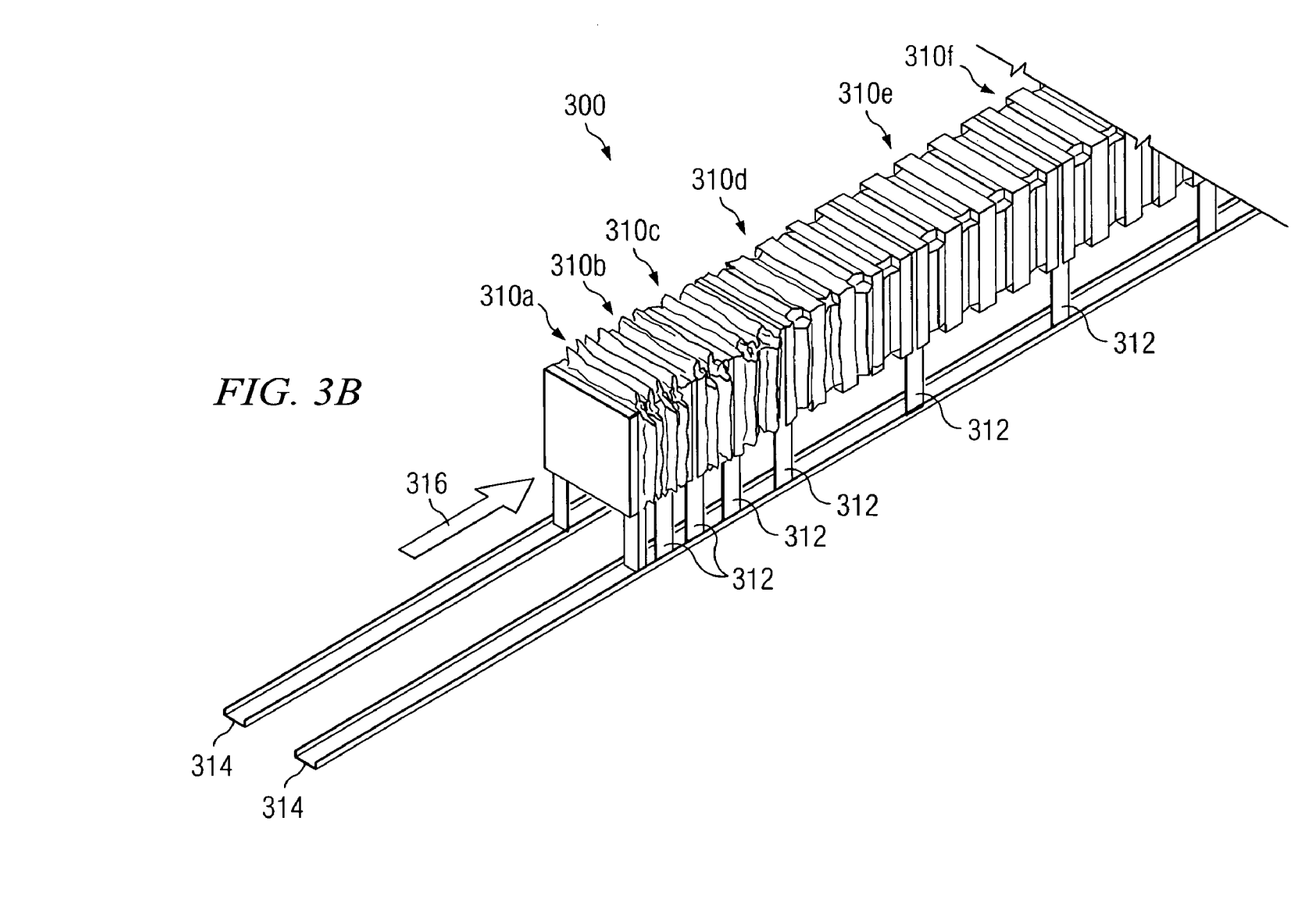
FIG. 3B illustrates the crash cushion of FIG. 3A fully crushed under frontal impact according to one embodiment of the invention.

FIG. 3B illustrates crash cushion 300 fully crushed under a frontal impact, as illustrated by arrow 316, according to one embodiment of the invention. As illustrated, support posts 312 have slid along the rail members 314 as the first approximately three energy-absorbing devices 310a, 310b, 310c have collapsed. Because of notches associated with energy-absorbing devices 310, the tops and sides of each energy-absorbing device 310 have buckled to generally form either horizontal or vertical bends, as illustrated. This allows energy-absorbing devices 310 to absorb and/or attenuate energy for the impact from direction 316.

Many different types of designs for many different types of applications and expected impacts are possible with energy-absorbing devices of the present invention. For example, with reference to crash cushion 300 of FIGS. 3A and 3B, the energy-absorbing devices 310 may be sequentially designed to be stronger in longitudinal compression (i.e., harder to collapse) as their location moves from a front of crash cushion 300 to a rear of crash cushion 300. In other words, referring to FIG. 3A, energy-absorbing device 310a may be designed to be a little bit weaker in longitudinal compression than energy-absorbing device 310b, and so on and so forth along the longitudinal length of crash cushion 300.

Although example embodiments of the invention and some of their advantages are described in detail, a person skilled in the art could make various alterations, additions, and omissions without departing from the spirit and scope of the present invention as defined by the appended claims.

What is claimed is:
1. An energy-absorbing device, comprising;
a single sheet of material formed into a section having a plurality of crush zones along a longitudinal length thereof;
each crush zone comprising:
a pair of vertical bends formed in a first side and a second side of the section;
a pair of horizontal bends formed in a top and a bottom of the section; and
a plurality of notches formed proximate the intersections of the vertical bends and horizontal bends, each notch comprising a cutout formed in a selected one of the first side, second side, top, or bottom, each cutout resulting from a removal of a portion of the selected one of the first side, second side, top, or bottom from an edge of the selected one of the first side, second side, top, or bottom; and the vertical bends projecting in a direction that is one of inward and outward and the horizontal bends projecting in a direction opposite that of the vertical bends.

2. The device of claim 1, further comprising a structural frame surrounding a perimeter of a front end of the section.

3. The device of claim 1, further comprising an impact head coupled to a front end of the section.

4. The device of claim 1, wherein the material comprises structural steel having a thickness from approximately twelve gage to approximately eight gage.

5. The device of claim 1, wherein the notches have a shape selected from the group consisting of rectangular, trapezoidal, and circular.

6. The device of claim 1, wherein the notches are formed only in the top and bottom of the section.

7. The device of claim 1, wherein the notches are formed in both the top and sides and the bottom and sides of the section.

8. An energy-absorbing device, comprising:
a section of material having a plurality of crush zones along a longitudinal length thereof;
a first crush zone of the plurality of crush zones comprising:
a pair of opposed first bends formed in a first side and a second side of the section;
a pair of opposed second bends formed in a third side and a fourth side of the section;
a first set of notches spaced around a perimeter of the section at a longitudinal location corresponding to the first bends and second bends, each notch in the first set of notches comprising a cutout formed in a selected one of the first, second, third, or fourth sides, each cutout resulting from a removal of a portion of the selected one of the first side, second side, top, or bottom from an edge of the selected one of the first side, second side, top, or bottom; and
the first bends projecting in a direction that is one of inward and outward and the second bends projecting in a direction opposite that of the first bends; and
wherein at least one of the other crush zones comprises a second set of notches spaced around the perimeter of the section.

9. The device of claim 8, wherein the section is a generally rectangular section, the first bends are substantially vertical, and the second bends are substantially horizontal.

10. The device of claim 9, wherein at least one of the other crush zones comprises an additional set of vertical and horizontal bends.

11. The device of claim 8, wherein the material comprises structural steel having a thickness from approximately twelve gage to approximately eight gage.

12. The device of claim 8, wherein the first bends and the second bends are in longitudinal alignment.

13. The device of claim 8, wherein the first bends and the second bends are selected from the group consisting of angled bends and curved bends.

14. The device of claim 8, further comprising an impact head coupled to a front end of the section.

15. The device of claim 8, wherein the notches have a shape selected from the group consisting of rectangular, trapezoidal, and circular.

16. The device of claim 8, wherein the notches are formed only in the third and fourth sides of the section.

17. An energy-absorbing device, comprising:
a horizontally-oriented section comprising:
first and second sides each having at least one substantially vertical bend therein, the first and second sides configured to collapsibly fold during a longitudinal impact;
a top and a bottom each having at least one substantially horizontal bend therein, the top and the bottom configured to collapsibly fold during the longitudinal impact;
a plurality of cutouts formed proximate the intersections of the vertical bends and horizontal bends, each cutout formed in a selected one of the first side, second side, top, or bottom, each cutout resulting from a removal of a portion of the selected one of the first side, second side, top, or bottom from an edge of the selected one of the first side, second side, top, or bottom;
the vertical bends projecting in a direction that is one of inward and outward and the horizontal bends projecting in a direction opposite that of the vertical bends; and
the vertical bends and the horizontal bends being in longitudinal alignment.

18. The device of claim 17, wherein the section is formed from structural steel having a thickness from approximately twelve gage to approximately eight gage.

19. The device of claim 17, wherein the vertical bends and the horizontal bends are selected from the group consisting of angled bends and curved bends.

20. An energy-absorbing device, comprising:
a horizontally-oriented section comprising:
first and second sides;
a top and a bottom coupled to the first and second sides to generally form four corners; and
a plurality of notches formed proximate the four corners of the horizontally-oriented section, the notches intermittently spaced along a longitudinal length of the horizontally-oriented section to allow the horizontally-oriented section to collapsibly fold during a longitudinal impact, each notch comprising a cutout formed in a selected one of the first side, second side, top, or bottom, each cutout resulting from a removal of a portion of the selected one of the first side, second side, top, or bottom from an edge of the selected one of the first side, second side, top, or bottom.

21. The device of claim 20, wherein the notches have a shape selected from the group consisting of rectangular, trapezoidal, and circular.

22. The device of claim 20, wherein the notches are formed only in the top and bottom of the horizontally-oriented section.

23. A crash cushion, comprising:
a plurality of energy absorbing devices, each device comprising:
a section of material having a plurality of crush zones along a longitudinal length thereof;
a first crush zone of the plurality of crush zones comprising:
a pair of opposed first bends formed in a first side and a second side of the section;
a pair of opposed second bends formed in a third side and a fourth side of the section;
a first set of notches spaced around a perimeter of the section at a longitudinal location corresponding to the first bends and second bends, each notch comprising a cutout formed in a selected one of the first, second, third, or fourth sides, each cutout resulting from a removal of a portion of the selected one of the first side, second side, top, or bottom from an edge of the selected one of the first side, second side, top, or bottom; and the first bends projecting in a direction that is one of inward and outward and the second bends projecting in a direction opposite that of the first bends; and wherein at least one of the other crush zones comprises a second set of notches spaced around the perimeter of the section.

24. The crash cushion of claim 23, further comprising:

a plurality of support posts coupled along the length of the plurality of devices for supporting the crash cushion.

25. The device of claim 24, further comprising at least two ground-mounted rail members engaged with the plurality of support posts to allow for slidable movement of the support posts along the rail members as the devices collapse.

26. A method of absorbing energy from an impact, comprising:

providing a section of material having a plurality of crush zones along a longitudinal length thereof, each crush zone comprising:

a pair of vertical bends formed in a first side and a second side of the section;

a pair of horizontal bends formed in a top and a bottom of the section; and a plurality of notches formed proximate the intersections of the vertical bends and horizontal bends, each notch comprising a cutout formed in a selected one of the first side, second side, top, or bottom, each cutout resulting from a removal of a portion of the selected one of the first side, second side, top, or bottom from an edge of the selected one of the first side, second side, top, or bottom; and in response to an impact at a front of the section, causing the pair of vertical bends to move in a direction that is one of inward and outward and the pair of horizontal bends to move in a direction opposite that of the first vertical to collapse at least part of the section.

* * * * *